United States Patent
Lobman et al.

(10) Patent No.: US 7,347,327 B2
(45) Date of Patent: Mar. 25, 2008

(54) STACKABLE AND NESTABLE RECEPTACLES

(76) Inventors: Matthew Lobman, 26 Overlook Dr., Laurel Hollow, NY (US) 11791; Richard Powers, 36 4th St., Hicksville, NY (US) 11801; Wu Ping, Houcang Section, Yinxian Avenue, Ningbo (CN)

( * ) Notice: Subject to any disclaimer, the term of this patent is extended or adjusted under 35 U.S.C. 154(b) by 680 days.

(21) Appl. No.: 10/844,894

(22) Filed: May 13, 2004

(65) Prior Publication Data
US 2005/0252814 A1     Nov. 17, 2005

(51) Int. Cl.
*B65D 21/00* (2006.01)
*B65D 85/62* (2006.01)
(52) U.S. Cl. .................... 206/518; 220/657; 206/519
(58) Field of Classification Search ............ 206/518, 206/519, 557; 220/571, 573.1, 574, 658, 220/657
See application file for complete search history.

(56) References Cited

U.S. PATENT DOCUMENTS

| | | | |
|---|---|---|---|
| 3,344,974 A * | 10/1967 | Bostrom .................. 229/123.1 |
| 4,113,095 A * | 9/1978 | Dietz et al. ................. 206/508 |
| 4,616,762 A * | 10/1986 | Alexander .................. 220/658 |
| 4,660,734 A | 4/1987 | Heaney et al. |
| D291,526 S | 8/1987 | Heaney et al. |
| 4,689,275 A | 8/1987 | Sandman |
| 4,828,112 A | 5/1989 | Vollrath et al. |
| 4,967,908 A | 11/1990 | Kessler |
| 5,035,327 A | 7/1991 | Denzin et al. |
| 5,048,714 A | 9/1991 | Stevens |
| 5,119,800 A | 6/1992 | Roberts et al. |
| 5,131,708 A | 7/1992 | Denzin |
| D333,944 S | 3/1993 | Denzin et al. |
| 5,375,719 A | 12/1994 | Mittmann et al. |
| 5,474,184 A | 12/1995 | Mandler et al. |
| 5,676,276 A | 10/1997 | Zielinski et al. |
| D417,361 S | 12/1999 | Mittmann et al. |
| D422,836 S | 4/2000 | Mittmann |
| D427,482 S | 7/2000 | Mittmann |
| D431,148 S | 9/2000 | Mittmann |
| D435,390 S | 12/2000 | Mittmann |
| D443,173 S | 6/2001 | Danielsen et al. |

(Continued)

*Primary Examiner*—Anthony D. Stashick
*Assistant Examiner*—Harry A Grosso
(74) *Attorney, Agent, or Firm*—Scully, Scott, Murphy & Presser, P.C.

(57) ABSTRACT

A receptacle, which is adapted for nesting and stacking with similar receptacles. The invention, the receptacle is intended in particular to be utilized as a food pan for the receiving and storing of hot or cold food items, and, which may be employed in connection with buffet or steam tables, among other diverse uses thereof. The receptacle is preferably constituted of a metallic material, such as aluminum or stainless steel, which is compatible with food service requirements and sanitary prescriptions or regulations having a generally rectangular flat bottom, and wherein lower side and end walls extend upwardly in an outwardly angled slope from rounded edges connecting the receptacle bottom to the lower ends of the walls. At the upper ends of each of the side and end walls, these extend into outwardly and upwardly curved wall structures, which form a curvilinear ledge. The upper and resulting radially outer edge of this ledge extends into the lower ends of upper side and end walls which slope inwardly towards their upper ends to define a receptacle opening somewhat closer to the size of the opening of the receptacle defined by the upper ends of the lower side and end walls of the receptacle.

8 Claims, 4 Drawing Sheets

U.S. PATENT DOCUMENTS

| | | |
|---|---|---|
| D446,993 S | 8/2001 | Zank |
| D446,994 S | 8/2001 | Zank |
| D449,205 S | 10/2001 | Zank |
| 6,349,843 B1 | 2/2002 | Mittmann et al. |
| D454,751 S | 3/2002 | Zank |
| 6,415,945 B1 | 7/2002 | Zank et al. |
| 6,557,720 B2 | 5/2003 | Tosdale et al. |
| 6,568,534 B2 | 5/2003 | Zank |

* cited by examiner

STACKABLE AND NESTABLE RECEPTACLES

BACKGROUND OF THE INVENTION

1. Field of the Invention

The present invention relates to a receptacle, which is adapted for nesting and stacking with similar receptacles. Pursuant to the invention, the receptacle is intended in particular to be utilized as a food pan for the receiving and storing of hot or cold food items, and, which may be employed in connection with buffet or steam tables, among other diverse uses thereof.

In the instance of such receptacles, which are normally constituted of metal and are employed as food pans for buffets or steam tables, they are intended to receive and store various types of either hot or cold foods, although also adapted to receive and store non-food items, the receptacles must be able to be readily removed from the buffet tables in order to be either replaced by other similar receptacles, or for replenishing the food items contained therein. Generally, such food pans or receptacles must also be designed so as to be able to impart a sealing relationship between the receptacles and the buffet table on which they are positioned to thereby prevent any steam or cold air employed for, respectively, maintaining the food items in a hot or cold condition from below the receptacles escaping to the surroundings around the edges or rims of the receptacle.

Frequently, in order to facilitate the removal of the receptacles from their positions in which they are arranged on the buffet table, they must be lifted in a manner to prevent any burns or injury being sustained by the hands or the fingers of a person manipulating the receptacles, particularly inasmuch as the receptacles may be in a condition in which they possess extremely hot surfaces.

Moreover, it is also important to be able to arrange the receptacles, when these are food pans of essentially or preferably rectangular or parallel multi-cornered configurations to be able during non-use thereof to facilitate their stacking in nested relationships with other similar receptacles in a manner in which they are secure from shifting movement relative to each other to prevent a stack of nested receptacles to unduly tilt and possibly drop down, while concurrently being designed to avoid jamming when in their stack and nested conditions.

2. Discussion of the Prior Art

A considerable variety of receptacles or food pans possessed of generally nestable and stackable attributes, preferably constituted of metal, which may be employed for the positioning on buffet or steam tables, are well-known and widely employed in the food service industry, as well as for other uses in the storage of non-food items or products.

Zielinski, et al., U.S. Pat. No. 5,676,276 disclose a metallic buffet table food pan having outwardly sloping sidewalls with a rim portion which incorporates a notched flange structure, which facilitates the manual grasping and removing of the pan from the buffet table in which it is supported, so as to thereby avoid burns and injuries to the hands or fingers of handling personnel.

Mittmann, et al., U.S. Pat. No. 5,375,719 disclose a receptacle configured for nested stacking with other similar receptacles, which includes outwardly extending bump-like corner structures at the upper rim edge thereof, enabling support of superimposed trays and stacking without interference relative to each other at the various corner sites thereof.

Vollrath, et al., U.S. Pat. No. 4,828,112 disclose receptacles comprising stackable and nestable metal transport pans, which are adapted to have surface deformations formed in the sidewalls thereof, facilitating nested engagement of superimposed pans on ledges intermediate outwardly sloping lower sidewalls and essentially vertical upper sidewalls terminating in a flange-like rim configuration.

Other similar kinds of receptacles or food pans, which include structure for nesting and superimposing these in a stacked relationship are disclosed, by way of examples, in Mittmann, et al., U.S. Pat. No. 6,349,843 B1; Zank, U.S. Pat. No. 6,568,534 B2; Tosdale, et al., U.S. Pat. No. 6,557,720 B2; and Zank, et al., U.S. Pat. No. 6,415,945 B1.

SUMMARY OF THE INVENTION

In order to distinguish structurally and functionally in an advantageous manner over the forgoing food pans or receptacles, the latter of which are generally known in the industry, pursuant to the present invention there is accordingly provided a nestable and stackable food pan or receptacle, which may be a food pan structure, and is preferably constituted of a metallic material, such as aluminum or stainless steel, which is compatible with food service requirements and sanitary prescriptions or regulations having a generally rectangular flat bottom, and wherein lower side and end walls extend upwardly in an outwardly angled slope from rounded edges connecting the receptacle bottom to the lower ends of the walls. At the upper ends of each of the side and end walls, these extend into outwardly and upwardly curved wall structures, which form a curvilinear ledge. The upper and resulting radially outer edge of this ledge extends into the lower ends of upper side and end walls which slope inwardly towards their upper ends to define a receptacle opening somewhat closer to the size of the opening of the receptacle defined by the upper ends of the lower side and end walls of the receptacle.

The upper end of the inwardly sloping or angled upper side and end walls extend radially outwardly into a flanged rim structure of a substantially horizontally directed planar configuration, and terminating in a downwardly depending radially outer peripheral lip, as is generally known in such receptacle or pan constructions.

In a novel manner, the corners of the flanged rim intermediate each of the upper side and end walls are provided with essentially wedge-shaped depressions widening towards the inner end of the rim at the receptacle opening, so as to form a reinforcing flange structure at each of the corners of the receptacle, inhibiting bending or distortions of the receptacle while being lifted or transported in the filled condition thereof.

The upwardly inward directed slope or taper of the upper side and end wall portions of the receptacle thus provides, at the lower ledge configuration for the flanged rim of a tray, which is nested therebelow and is, accordingly, in close contact with the outwardly sloping outer surface of the lower side and end walls of the tray and thus aids in inhibiting any extensive axial displacement which would tend to adversely influence the stability against toppling of a high stack of superimposed receptacles, while ensuring that jamming between superimposed stacked and nested receptacles is avoided.

Furthermore, the wedge-shaped indentation formed in each of the corners of the peripheral flange at the upper end of the receptacle provides for a reinforcing structure preventing any excessive deflection or distortion of the rim portion, and resultingly the receptacle, when the receptacle is filled with food items or other heavy or fluid product and is being transported or carried by a person, thereby imparting a greater stiffness or rigidity and strength to the overall structure of the receptacle. This will, in cases of transporting hot foods, particularly those liquid or fluid in nature, assist in preventing spillage of the receptacle contents which may cause the carrying person to be exposed to burns or other injuries.

Accordingly, it is an object of the present invention to provide a nestable and stackable receptacle, which possesses an enhanced degree of strength and versatility relative to presently known receptacles of this type.

Another object resides in the provision of a nestable and stackable receptacle of metallic construction having a flat bottom and upstanding outwardly angled lower side and end walls, which at their upper ends connect to an outwardly curved ledge-forming structure which extends into upwardly and inwardly sloped upper side and end walls at their upper ends terminating into a peripheral horizontally planar rim and depending outer flange configuration.

Yet another object is to provide a receptacle of the type described hereinbefore in which the corners of the upper peripheral rim or flange structure are provided with inwardly widening wedge-shaped depending portions, which impart a reinforcing or stiffening effect to the receptacle tending to inhibit undue distortions and deflections thereof in use when filled with product.

BRIEF DESCRIPTION OF THE DRAWINGS

Reference may now be made to the following detailed description of preferred embodiments of the invention, taken in conjunction with the accompanying drawings; in which.

BRIEF DESCRIPTION OF THE INVENTION

Figure 1:
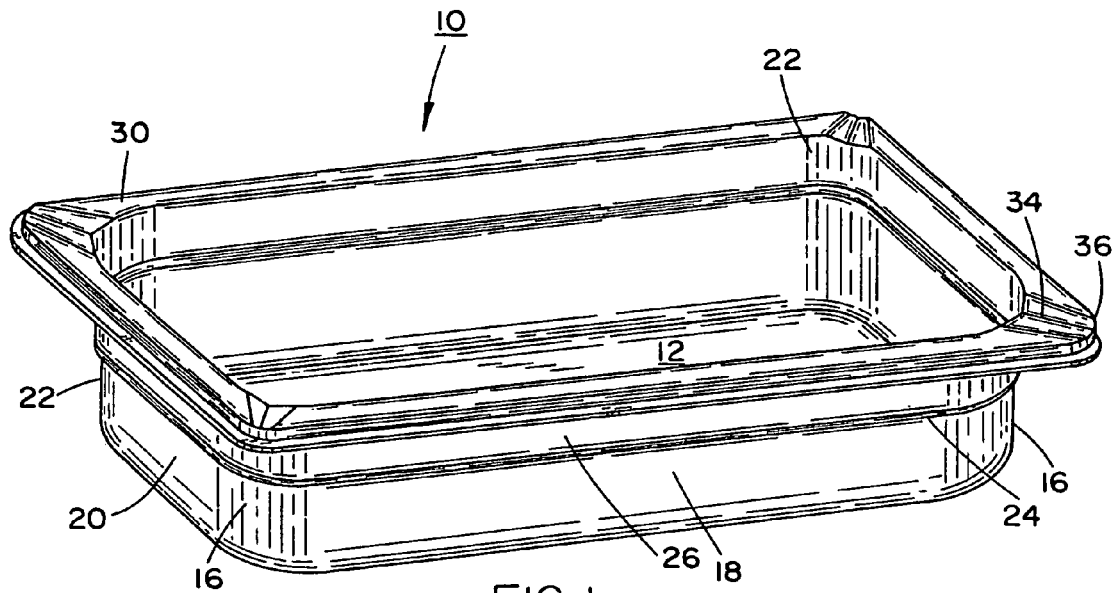
FIG. 1 illustrates a perspective view of a nestable and stackable receptacle pursuant to the present invention.

Referring now, more specifically, to the drawings and, in particular, to the embodiment shown in FIGS. 1-7, there is illustrated a receptacle 10 of generally rectangular configuration, which may be adapted for utilization as a food pan for buffet or steam tables, which serve to support one or more such as or similar kinds of receptacles containing either hot or cold foods, as is well known in the food service and catering industry.

The receptacle 10 may preferably be constructed of a metallic material, such as aluminum or stainless steel compatible with food storage requirements and sanitary regulations, and may be stamped and shaped from sheet metal sections or pieces.

As illustrated, the receptacle 10 has a flat bottom 12 with rounded edges 14 and corners 16 extending upwardly into outwardly tapering or sloped side walls 18 and end walls 20, which are connected to each other by means of rounded corners 22. The upper ends of the respective side and end walls 18, 20, are angled outwardly to form a peripheral ledge 24 of curvilinear shape, which at its upper end extends to lower ends of the upper side walls 26 and end walls 28. These upper side and end walls 26, 28 extend to upper ends into a horizontal, radially outwardly extending planar rim 30 of flange-shaped configuration having an outer downwardly and radially outwardly pending flange edge portion 32, which, in essence, imparts a somewhat stiffening structure to the rim 30 of the receptacle 10.

Figure 6:
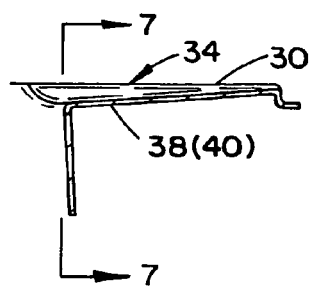
FIG. 6 illustrates, on an enlarged scale, a sectional view taken along line 6-6 in FIG. 2.
Figure 7:
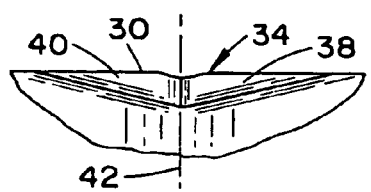
FIG. 7 illustrates a fragmentary sectional view taken along line 7-7 in FIG. 6.

In accordance with a particularly advantageous feature of the invention, each of the corners of the receptacle rim 30, as illustrated in detail in FIGS. 6 and 7 of the drawings, is provided with a wedge-shaped indentation 34, widening towards the interior opening at the upper end of the receptacle 10 and narrowing towards the outer edge 36 of the rim so as to form wedge surfaces 38, 40, imparting a reinforcing or stiffening structure to the corners of the receptacle, while concurrently strengthening the flanged rim 30 and inhibiting flexing or distortion thereof. Moreover, when the receptacle 10 is positioned in a supporting buffet table or steam table (not shown), the depending wedge-shaped indentations 34 in the corners may provide a supporting ledge, which facilitates the lifting and/or manipulating of the receptacle 10 by the hands or fingers of a person. In essence, as shown in FIGS. 6 and 7, each of the wedge-shaped indentations 34 provided in the flange or rim structure corners is tapered downwardly and radially inwardly along a median or center line 42 and the wedge surfaces 38, 40 on both sides thereof slope downwardly from the narrower end at the outer edge of the rim 30 into a wider extent at the inner edge where the rim 30 meets the perimeter of the opening at the upper ends of upper side and end walls 26, 28 of the receptacle 10.

The flanged rim 30 on the upper end of the upper inwardly sloped side and end walls 26, 28 is adapted to form a support of the ledge 24 at the upper end of the lower side and end walls 18, 20 of a receptacle 10 nested therebelow in a close manner, with dependent wedge-shaped indentations 34 at the corners 32 will prevent any sealing or jamming together of stacked and nested superimposed receptacles due to enabling of air to pass through the corners 32 between the stacked receptacles 10.

Figure 2:
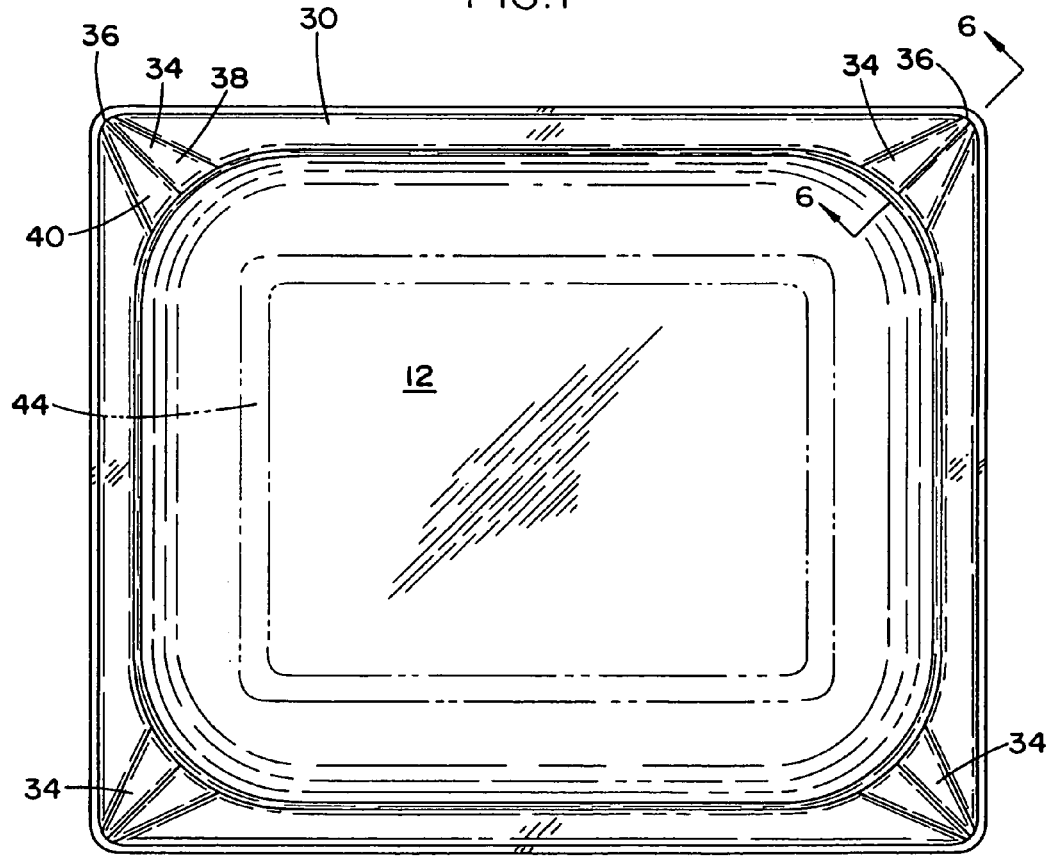
FIG. 2 illustrates a top plan view of the receptacle of FIG. 1.
Figure 3:
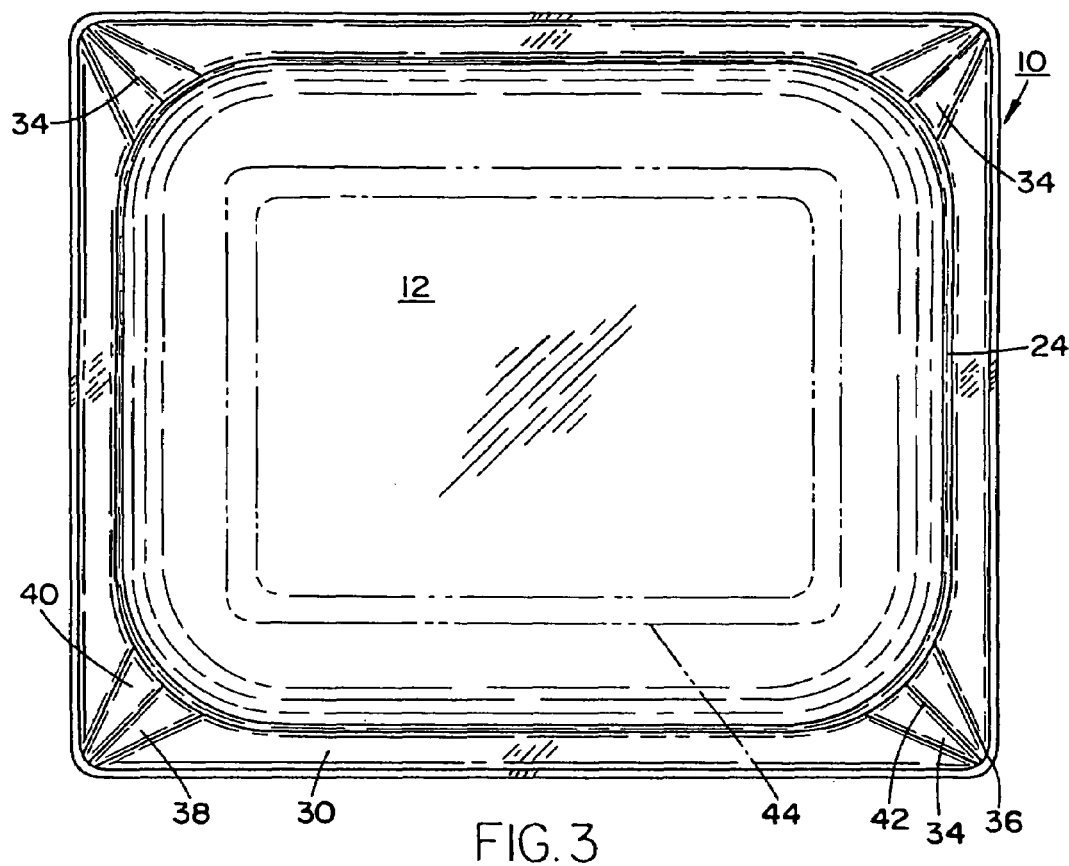
FIG. 3 illustrates a bottom plan view of the receptacle.
Figure 4:
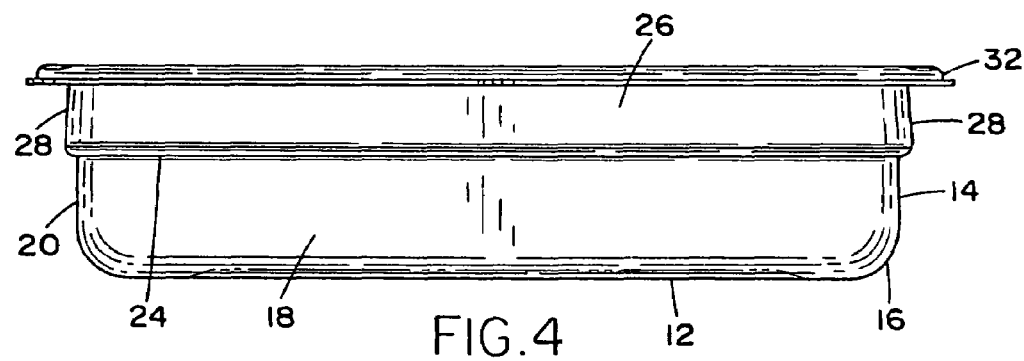
FIG. 4 illustrates a front view of the receptacle, the rear view being a mirror-image thereof.
Figure 5:
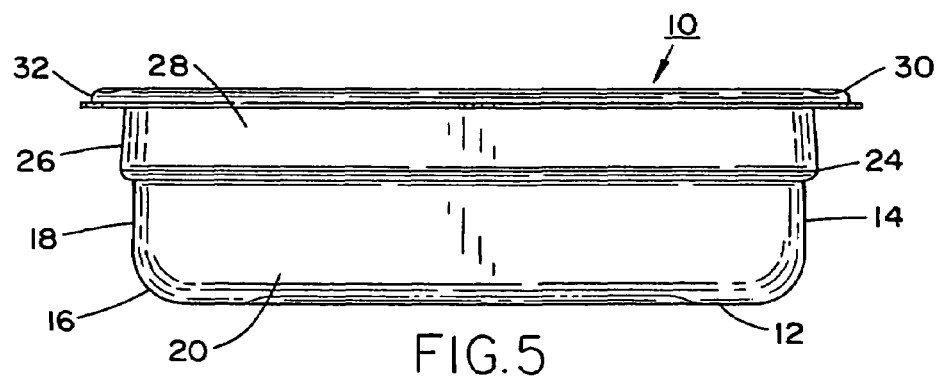
FIG. 5 illustrates an end view of the receptacle, the opposite end being a mirror-image thereof.

Furthermore, the flat bottom 12 of the receptacle 10 may be optionally formed with a raised surface portion, which may also impart a further stiffening feature to the receptacle bottom, as shown by the phantom-line 44 in FIGS. 2 and 3.

Figure 8:
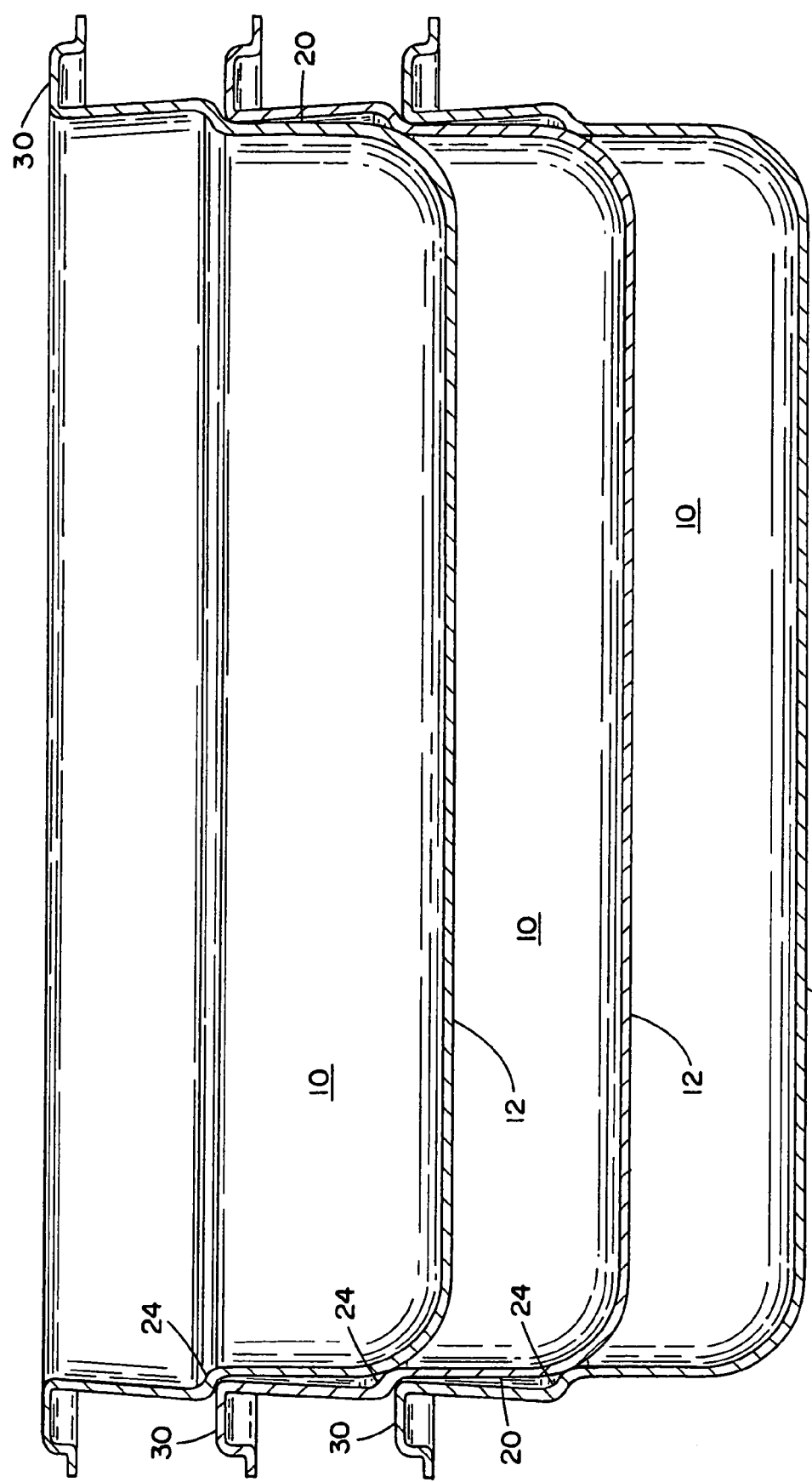
FIG. 8 illustrates a transverse sectional view diagrammatically showing a plurality of the receptacles of FIG. 1 in stacked and nested relationships.

As illustrated in FIG. 8, there is diagrammatically illustrated a plurality of receptacles 10, as shown in stacked and nested positions thereof, whereby the rounded ledge 24 at the upper ends of each the lower end and side walls 18, 20 of a respective receptacle is positioned on the inner edge of the flanged rim 30 of a receptacle 10 arranged nested therebelow, and with the inward taper or slope of the upper side and end walls 26, 28 ensuring that a minimum extent of axial displacement is permitted between superimposed stacked receptacles, thereby assuring the stability thereof.

Figure 9:
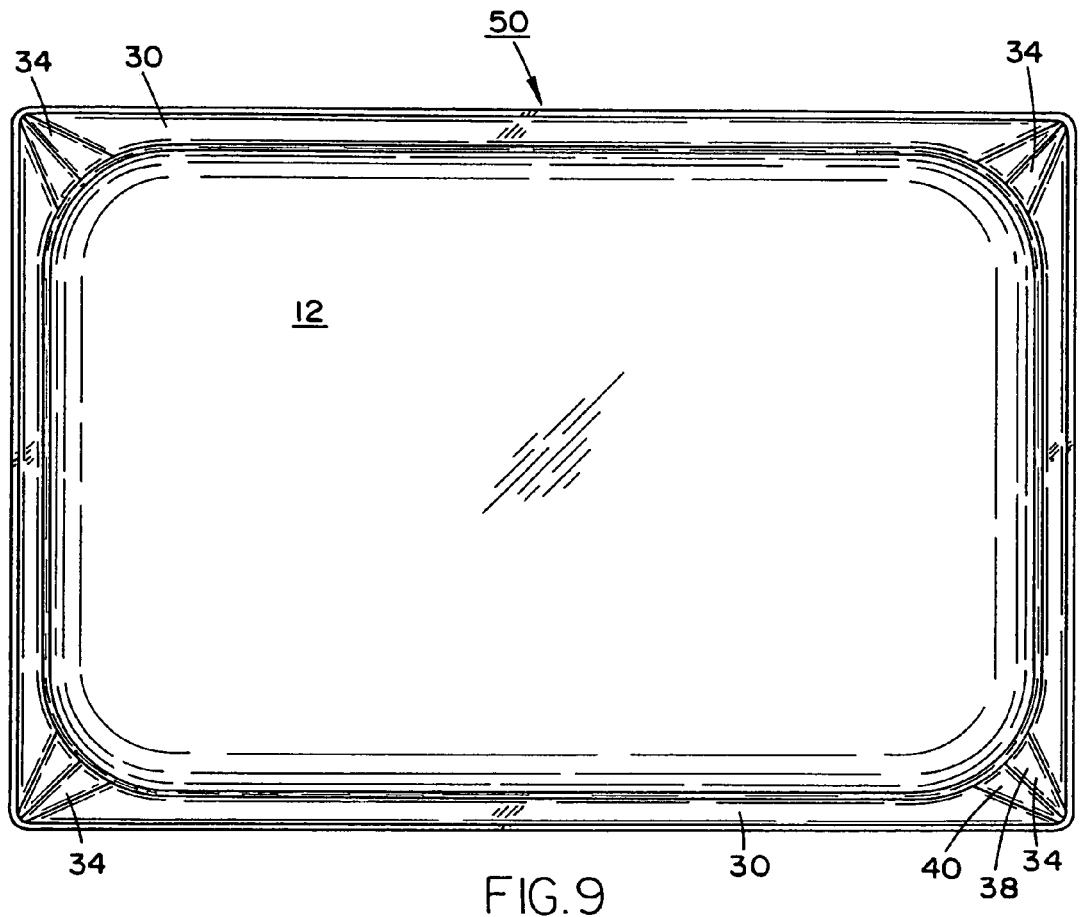
FIG. 9 illustrates a top plan view of a somewhat modified receptacle compared to that in FIG. 1.
Figure 10:
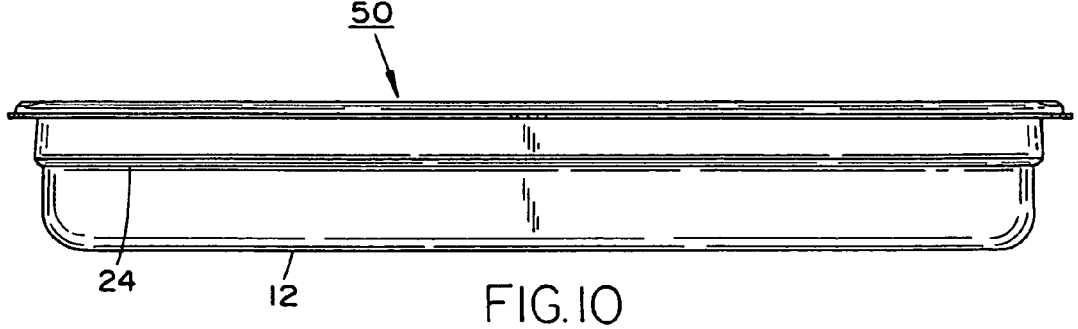
FIG. 10 illustrates a side view of the receptacle of FIG. 9.

Referring to the embodiment of FIGS. 9 and 10 in which elements which are identical with or similar to those of the embodiment of FIGS. 1-7 are designated by the same reference numerals, in this instance, the food pan or receptacle 50 is of a more elongate configuration, rather than being more squared off, all other integers being similar to the previous embodiment. Within the scope of the invention, other shapes of receptacles may be readily considered herewith.

From the foregoing, it becomes readily apparent that the present receptacle provides for a unique and advantageous configuration, particularly, adapted to the requirements of the food service industry when employed in connection with steam or buffet tables serving either hot or cold foods.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A stackable and nestable receptacle comprising:
a generally flat receptacle bottom;
a first wall structure extending upwardly from said receptacle bottom and encompassing the perimeter of said receptacle bottom, said wall structure including first and second opposed side walls and first and second opposed end walls, said side walls and end walls sloping outwardly relative to each other and being joined at corners formed between each of said respective side and end walls;
a radially outwardly and upwardly directed peripheral ledge extending from the upper end of said side and end walls;
a second wall structure extending upwardly from the upper end of said peripheral ledge, said second wall structure including first and second opposed side walls and first and second opposed end walls sloping inwardly relative to each other and being joined at corners between each of said respective side and end walls so as to provide a rectangular top opening for said receptacles; and a generally planar top flange extending outwardly from the upper end of said second wall structure to define a continuous perimetrical rim extending about said receptacle, said planar flange forming said perimetrical rim extending horizontally from the upper end of said second wall structure; and recesses being formed in each of the corners of said planar flange for reinforcing said rim, each said recess defining a wedge-shaped detent comprising a pair of contiguous mutually angled flat surfaces at an obtuse angle relative to each other, and extending at a downward slope towards the opening of said receptacle across the width of said flange at the corners thereof, and widening inwardly from a narrow end at the radially outer rim of said flange into a wide recess at the opening of said receptacle.

2. A receptacle as claimed in claim 1, wherein said ledge formed between said first and second wall structures defines an outwardly arcuate configuration having an upper edge extending into the lower end of said inwardly tapering second wall structure.

3. A receptacle as claimed in claim 1, wherein said receptacle is constituted of a metallic material.

4. A receptacle as claimed in claim 3, wherein said metallic material is selected from the group of materials consisting of aluminum and stainless steel.

5. A receptacle as claimed in claim 4, wherein said receptacle is formed from a stamping of sheet metal consisting of said aluminum or stainless steel.

6. A receptacle as claimed in claim 1, wherein said peripheral ledge between said first and second wall structures forms a support for said receptacle upon stacking thereof on a further receptacle arranged therebelow.

7. A receptacle as claimed in claim 1, wherein said receptacle bottom includes a raised flat surface portion for increasing the rigidity of said bottom.

8. A receptacle as claimed in claim 1, wherein said receptacle has a square or rectangular configuration.

\* \* \* \* \*